Oct. 22, 1963  D. P. DEITESFELD  3,107,449
THREE-DIMENSIONAL DISPLAY DEVICE
Filed Oct. 27, 1960
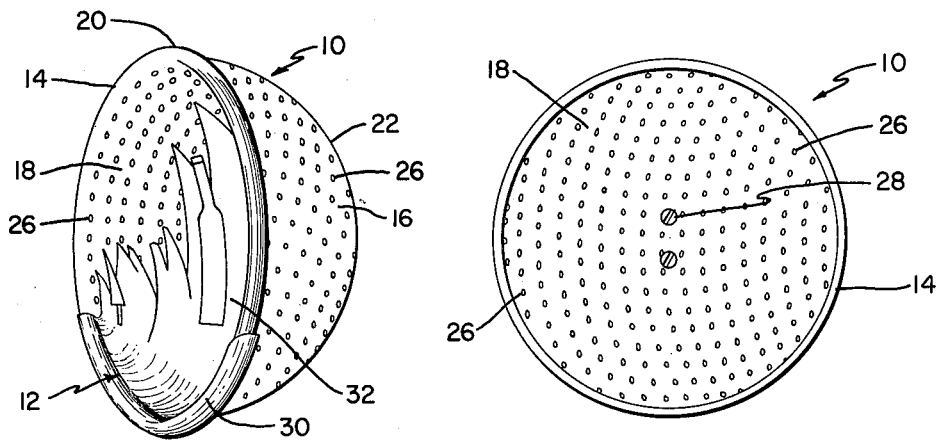
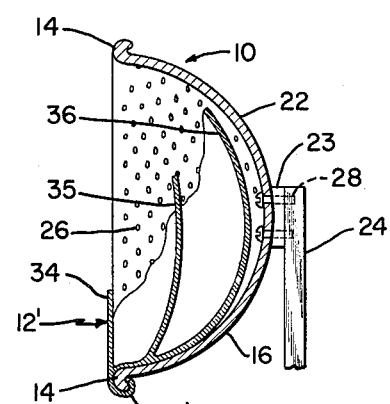
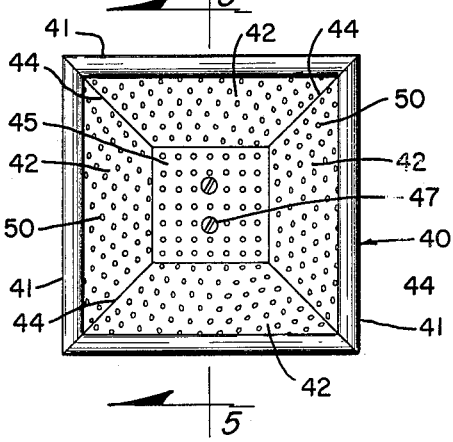
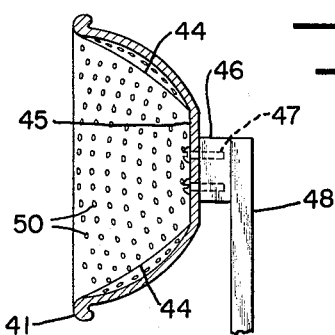
INVENTOR.
DONALD P. DEITESFELD
BY
*John E. Reilly*
ATTORNEY United States Patent Office 3,107,449
Patented Oct. 22, 1963

3,107,449
THREE-DIMENSIONAL DISPLAY DEVICE
Donald P. Deitesfeld, 120 W. 3rd Ave. Drive,
Broomfield Heights, Colo.
Filed Oct. 27, 1960, Ser. No. 65,460
4 Claims. (Cl. 40—125)

This invention relates to a new and useful article of manufacture, and more particularly relates to a display device, based on a novel concept in the advertising art, which is especially adapted for outdoor advertising such as, billboards and sign advertizing.

Advertising by mens such as signs and billboards has, in the past, been restricted to relatively flat supporting surfaces. Where three-dimensional displays are employed, they are usually self-supporting; that is, do not provide separable supporting surfaces and displays, and are largely confined to inside advertising in order to avoid the effects of the weather. In this relation, it is desirable to make the display portions easily interchangeable, so that the advertizement itself can be replaced or changed without reconstruction of the entire support. Typical of this is the billboard type display which merely requires a permanent, flat supporting structure, and the advertizement alone is replaced, generally by adhesively applying the new display over the original one. Yet, this well-known means of advertizing is somewhat laborious and time-consuming, and the billboard and display are subject to deterioration under adverse weather conditions. Moreover, no provision is made in known forms of displays of the types mentioned to lend three-dimensional qualities or depth to them without making them unduly complicated and expensive while avoiding weather effects. In connection with the latter, weather conditions must be considered, and particularly due to the general configuration of three-dimensional displays, they would normally be unduly affected by the weather, and subject to damage especially from wind, rain or snow.

Therefore, it is highly desirable to depart from known forms of advertising, particularly of the replaceable type, and to make provision for an advertising medium or display which is especially adapted for outdoor advertising and will secure substantial advances from the standpoint of appearance, ease of replacement, life and conformability for signs or displays of various configurations. More specifically, it is proposed to devise a display and especially a supporting structure which may be given a substantial amount of depth to have a definite three-dimensional effect to the extent of providing life-like characteristics to the advertising, yet will permit easy exchange of the advertising and in a manner such that the display will not be affected by adverse weather conditions and in fact, affords greater protection against the weather. Moreover, it is proposed to design the display, and particularly the supporting structure, such that it is more permanent and long lasting, and to associate therewith advertising which is itself of improved construction, longer lasting and easily interchangeable without affecting the supporting structure itself.

It is therefore a principal and foremost object of the present invention to make provision for a three-dimensional display installation incorporating a permanent supporting structure together with a means of advertising which is easily interchangeable, long-lasting, and in combination with the supporting structure is designed to minimize the effects of weather thereon and in fact affords greater protection from the weather than known forms of similar advertising.

It is another object of the present invention to provide for a display device having a supporting structure which is rugged, economical to manufacture and to maintain, relatively unaffected by weather conditions and permits ease of replaceability of the advertising matter used in association therewith.

It is a further object to make provision for a display device which is greatly simplified, economical to manufacture, labor and time-saving in use and most important is directed to an entirely new and unexpected concept in the art of signboard advertising whereby it is possible to lend the desired amount of depth tot he advertising in a greatly simplified manner and at a relatively low cost.

It is an additional object to make provision for a supporting structure for an advertising display having a minimum number of parts, easily formed and installed into a permanent mounting for replaceable or interchangeable signs of life-like characteristics, and which is particularly directed for use in conjunction with three-dimensional advertising displays in billboard advertising, and moreover where the entire supporting structure and display in fact represent savings in costs over similar known forms of present-day advertising.

The above and other objects, advantages and features of the present invention will become more apparent from the following detailed description taken together with the accompanying drawings, in which:

FIGURE 1 is a somewhat perspective view of a preferred form of holder portion forming a part of a supporting structure together with a preferred sign construction employed therewith.

FIGURE 2 is a front view of the main holder portion illustrated in FIGURE 1.

FIGURE 3 is a side sectional view of the supporting structure illustrated in FIGURES 1 and 2 and further illustrating an alternate form of sign construction which may be employed therewith.

FIGURE 4 is a front view of a modified form of supporting structure, in accordance with the present invention; and, FIGURE 5 is a view taken on line 5—5 of FIGURE 4.

As a setting for the present invention, it is directed primarily to signboard advertising of the type which may employ a supporting structure for permanent installation if desired, and is designed to accommodate signs of various types wherein the advertizement or sign may be easily switched or varied without affecting the supporting or holding structure. Thus, the common billboard or outdoor signs are generally illustrative of this advertising medium. More specifically, this invention is directed to a display installation of this general type which is designed so as to provide sufficient depth to the sign and in fact, to lend a decided three-dimensional effect. In addition, the advertising itself is most desirably designed for connection to such a supporting structure so as to utilize its depth characteristics and moreover, may have three-dimensional characteristics of its own. In this connection, the present invention represents an entirely new concept in advertising introducing outstanding qualities, associated with savings, in advertising over extended time intervals while incorporating all the advantages of known forms of advertising, such as the ability to exchange signs at little expense without reconstructing the supporting structure.

In the drawings, there is illustrated in FIGURES 1 and 2 a preferred from of installation in accordance with the present invention and illustrating in detail a holder portion 10 forming the main inventive part of the supporting structure, together with a sign insert portion 12 positioned within the holder. The holder 10 is preferably of a generally bowl-shaped configuration and may be either oval or round having a generally circular, forward peripheral edge portion 14 and rearwardly extending walls 16 converging in a uniform manner away from the forward peripheral edge portion 14. In this preferred form, the forward peripheral edge is of circular configuration. The walls 16 are shaped to converge in the form of a concave, semi-spherical portion so as to provide an interior wall surface 18 for reception of the sign insert 12. In addition, the forward edge 14 is preferably flared outwardly and doubled over to provide a lip 20 for rigid connection of the sign insert in place. In FIGURE 3, the entire supporting structure is illustrated where, in addition to the holder 10, the exterior wall surface 22 of the walls 16 is mounted by means of a bracket 23 and post 24 so that the forward peripheral edge 14 is disposed in upstanding vertical relation, or in other words, with the open end of the holder in horizontal facing relation. Although not fully shown, and depending upon the size of the holder portion and sign to be held in place, the post may either be driven into the ground or supported on an enlarged base resting on the ground or a flat surface.

In outdoor advertising, the greatest problem associated with design and construction of a supporting structure in the form described may be attributed to adverse effects of the elements, such as wind, rain, snow etc. This is particularly true in the case of the installation proposed where the main supporting portion for the sign is of generally bowl-shaped configuration so as to have a tendency to create an air pocket which would be greatly affect particularly by wind conditions, and would not provide any means for removal of rain or snow which would otherwise collect therein. In view of this, it has been found that by construction of the display to provide passages therethrough such as the perforations 26, it is possible to greatly minimize the effects of weather on the display. The perforations will serve not only as wind passages but will permit the removal of snow or water which would otherwise collect within the interior of the bowl and largely obscure the sign itself. Here, it is to be understood that various forms of openings may be employed to this end, it being the primary function of the openings to minimize the effects of the elements while not unduly reducing the strength of the supporting structure. For this reason, small openings or perforations are most preferably employed, although slots, or larger, more widely-spaced openings may be used as a substititute. To install the holder on the bracket 23, for instance, suitable bolts 28 may interconnect the members to mount the holder 10 securely in place. Moreover, it is preferred to form the front surface of the bracket 23 of a generally concave configuration conforming to the curvature of the rearward-most portion of the exterior wall surface 22 so that in this way the holder may be held in snug-fitting relation against vibration or movement in any direction.

Referring again to FIGURE 1, a preferred form of insert 12 is illustrated which consists of a generally concave form of sign depicting the desired advertizing material. Essentially, the curvature of the insert is shaped to conform to the contour of the interior wall surface of the holder itself, and thus, to utilize the three-dimensional characteristics of the holder while being protected to a large extent from weather conditions. Moreover, the insert is desirably formed to have three-dimensional characteristics of its own so that for example certain parts of the sign may be raised from the surface of the insert and at intervals extending rearwardly away from the forward edge of the insert, the forward edge being designated at 30 and the main body portion of the insert being designated at 32. In this manner, the configuration of the holder coupled with the configuration of the insert enables one to incorporate life-like characteristics into the sign in a simplified and low-cost manner.

An additional advantage of the sign insert 12 described is that the forward edge 30 may be given a generally U-shaped rim which may be clamped into place over the forward edge 14 of the holder so as to hold the sign securely in desired relation. Once mounted, it will further be noted that the insert occupies approximately two-thirds of the area of the wall portion 16 so as to leave a large portion of the wall open for the passage of wind. Although there is no critical limit regarding the proportion of the wall surface to be left open to compensate for weather conditions, it is generally desirable to leave approximately one-third of the holder uncovered for this purpose or, in any event, the holder itself should not be entirely covered by the sign insert. As an alternative, however, if for any reason it is desirable to utilize the entire interior wall surface of the holder, then the sign insert should be provided with perforations or openings along at least a portion thereof to permit the escape of rain, snow and wind, for example.

FIGURE 3 illustrates a modified form of sign insert 12' in which the advertizing matter is staggered in a series of planes, for example in the three planes 34, 35 and 36 the rearward-most plane conforming generally to the contour of the wall surface and the planes 34 and 35 being positioned in front of the rearward plane. This is another suitable means of lending the desired depth to the display and incorporating the advantages of the supporting structure itself. Again, the insert 12' may be provided with a clamping portion 30' to engage the edge 14 of the holder portion and for mounting of the entire sign in place.

A modified form of supporting structure, illustrating in particular the holder construction, is shown in FIGURES 4 and 5. Here, a forward peripheral edge portion 41 is of a generally polygonal configuration and in this form is shown as being of a rectangular shape to provide an enlarged rim area for attachment of a suitable sign insert, not shown, and separate wall portions 42 extend rearwardly from the forward peripheral edge portion so as to converge away from the edge portions in a uniform manner in order to lend the desired depth to the supporting structure and the sign to be mounted therein. Although the wall portions 42 may be flat, they are illustrated as preferably being of a concave configuration having curved intersecting corners 44 and terminating in a rearward, flat supporting area 45 at the center thereof. The support portion 45 is designed for abutment against a bracket 46 and may be attached thereto by suitable means such as bolts 47. Additionally, a standard or post 48 is shown connected to the bracket, either for positioning of the holder in the ground or mounting of an enlarged base portion, not shown.

Again, when using the supporting structure of the modified form of FIGURES 4 and 5 for outdoor displays, it is necessary to provide for the escape of water and the passage of wind therethrough. Accordingly, openings 50 are spaced at intervals throughout the supporting structure and are preferably of limited size so as not to reduce the strength of the holder.

Although not illustrated, the sign insert employed may be of any desired form, but is preferably either of the type illustrated in FIGURE 1, or that illustrated in FIGURE 3, and is designed to closely conform to the configuration of the holder at least to the extent of utilizing the depth thereof so as to provide a three-dimensional effect to the sign.

From the foregoing, there has been described the use of new and different display devices based on a novel concept in advertizing, which are primarily useful as a means of three-dimensional, outdoor signboard displays wherein a generally bowl-shaped structure of perforated construction is provided to allow for wind passage and water and snow drainage. The holder portion may be designed for almost any sized display and may be formed of a number of materials, such as for example, plastics, aluminum, anodized aluminum, masonite, or lightweight steel. In smaller size structures, such as for example, up to six feet in circumference, the holder portion would require probably only a single standard or post as a support in the manner described. For larger displays, of course, added support would be required. In either case, the basic structure could be employed as a permanent support and merely by interchanging the inserts the advertizing may be varied at periodic intervals.

As described, preferably the pictorial or advertizing matter for the display may be handled in either one of two ways, both giving the desired depth to the sign. One method is illustrated in FIGURE 3 where the advertizing is staggered in separate planes or panels and the other where a generally concave insert would be employed to fit around the perimeter of the sign and to clamp into position. Either would allow wide latitude and varied use of design, always giving full depth perception through the use of art techniques to gain the fullest idea of depth and shape. Thus, the use of a single insert would open up an entirely new area to advertising employing this sign since the panels or inserts could be interchanged periodically allowing an advertizer at a very small cost to change copy monthly or seasonally. In this connection, it is believed that displays formed in this manner would represent considerable savings over extended periods of time compared to present-day forms of billboard advertising due to the labor and time consumed in applying the paper-like material, for instance. In forming the concave insert 12 illustrated in FIGURE 1, the material is most desirably composed of a plastic which may be vacuum formed into the desired configuration, although it could be also stamped out of a metal material. It is emphasized in this connection, however, that it is the combined use of a holder providing natural depth characteristics with a sign also incorporating depth characteristics of its won which provides the unique three-dimensional effect accomplished while at the same time providing for the most rugged display which will be relatively unaffected by weather conditions, and various forms of advertising and sign constructions could be employed other than those suggested in combination with the supporting structure of the present invention.

It is accordingly to be understood that various modifications and changes may be made in the specific design construction and use of materials in practicing this invention without departing from the scope thereof, as defined by the appended claims and reasonable equivalents thereof.

What is claimed is:
1. A display assembly comprising a holder providing a forward peripheral edge with a rearwardly extending concave wall portion, means supporting said holder in upright, horizontally facing relation, a three-dimensional concave insert covering a major interior wall portion of said holder and conforming substantially to the contour of said holder and said insert having supporting means for securing said insert in place along said peripheral edge.

2. A display assembly according to claim 1 in which said holder includes an outwardly flared lip at its peripheral edge, and said supporting means is defined by a corresponding lip dimensioned to fit in snug-fitting relation over said outwardly flared lip.

3. A display assembly according to claim 1 wherein at least that portion of the wall remaining uncovered by said insert includes weather openings therein.

4. A three-dimensional display assembly comprising a generally bowl-shaped holder providing an outer peripheral edge and a uniformly convergent concave wall portion, means supporting said holder in upright horizontally facing relation, a three-dimensional concave insert covering the wall portion of said holder and conforming substantially to the contour of said holder, and said insert having supporting means for securing said insert in place along the peripheral edge of said holder.

References Cited in the file of this patent

UNITED STATES PATENTS

| | | |
|---|---|---|
| 1,023,471 | Hoffman | Apr. 16, 1912 |
| 1,298,840 | Wertz et al. | Apr. 1, 1919 |
| 1,658,883 | Cole | Feb. 14, 1928 |
| 1,659,508 | Allan | Feb. 14, 1928 |
| 1,848,950 | Hammers | Mar. 8, 1932 |
| 2,193,928 | Johnson | Mar. 19, 1940 |
| 2,360,438 | Mills | Oct. 17, 1944 |
| 2,565,553 | Foley | Aug. 28, 1951 |
| 2,834,134 | Young | May 13, 1958 |